March 6, 1945. F. E. TRINAJSTICH 2,371,003
HOLDER FOR ELECTRIC WELDING RODS
Filed Aug. 28, 1943
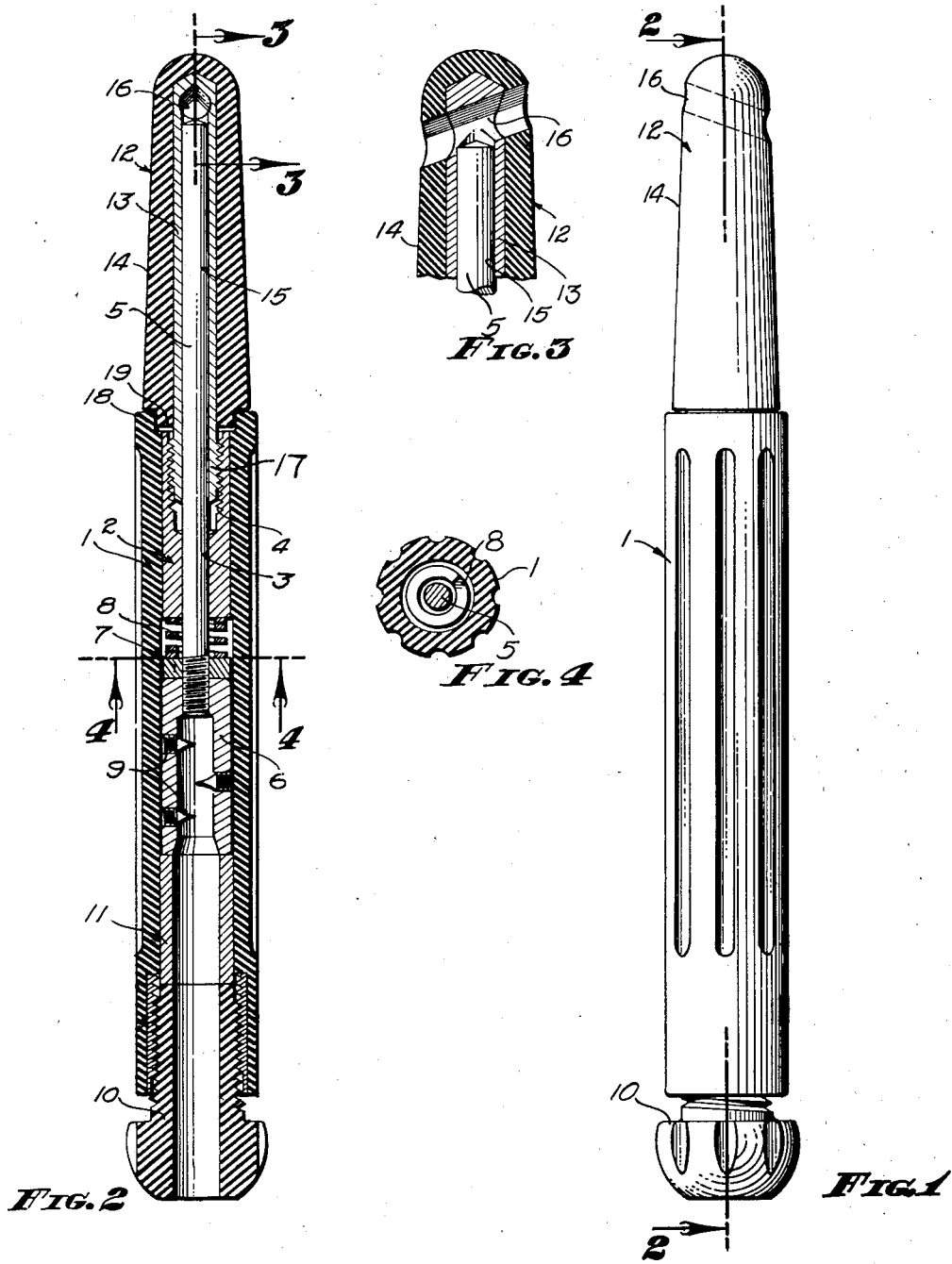
INVENTOR
FLORIAN E. TRINAJSTICH
BY Lloyd Spencer
ATTORNEY Patented Mar. 6, 1945

2,371,003

UNITED STATES PATENT OFFICE 2,371,003

HOLDER FOR ELECTRIC WELDING RODS

Florian Ernest Trinajstich, Los Angeles, Calif.

Application August 28, 1943, Serial No. 500,452

6 Claims. (Cl. 219—8)

My invention relates to holders for electric welding rods, and, among the objects of my invention are:

First, to provide a holder for electric welding rods which is totally insulated; that is, only the welding rod itself is exposed to complete the welding circuit.

Second, to provide a holder for electric welding rods which is capable of holding rods of different sizes, the holder incorporating a coarse adjusting means to set the holder for a given size of rod, and a fine adjusting means for cinching tightly upon the rod to effect an adequate electrical connection therewith.

Third, to provide a holder for electric welding rods which by reason of the aforementioned fine adjusting means provides a mechanical advantage so that only a relatively slight twist of the holder insures a complete electrical connection capable of carrying the large amount of current required for electric welding.

Fourth, to provide a holder for electric welding rods which is light in weight and simple to use, thereby providing a welding rod holder which is particularly suited for use by women welders.

With the above and other objects in view, as may appear hereinafter, reference is directed to the accompanying drawing, which:

Figure 1 is an elevational view of my holder for electric welding rods.

Figure 2 is a longitudinal sectional view thereof taken through 2—2 of Fig. 1.

Figure 3 is an enlarged fragmentary longitudinal sectional view thereof taken through 3—3 of Fig. 2.

Figure 4 is a transverse sectional view through 4—4 of Fig. 2.

My holder for electric welding rods includes a tubular handle 1 in one end of which is molded a metal insert 2. The insert is provided with a bore 3 and threaded counterbore 4. Its bore 3 receives a terminal rod 5 which protrudes from the handle 1. Within the handle, the terminal rod is screwthreaded into a connector socket 6 which is directed to the end of the handle 1 opposite from which the handle 1 protrudes. Between the connector socket 6 and insert 2, the terminal rod is provided with a lock nut 7 and is surrounded by a spring 8.

The terminal socket is adapted to receive the stranded conductors which comprise a conventional welding cable (not shown). The welding cable is secured by pointed wedging screws 9, and may, in addition, be soldered in place.

The cable extends from the end of the handle opposite from the terminal rod 5 and this end is provided with a threaded sleeve 10, having a knob portion at its outer end so that it may be readily turned relative to the handle 1. The threaded sleeve 10 urges the connector socket 6 through the means of a tubular spacer 11.

The protruding end of the terminal rod 5 is covered by a thimble 12 which includes a metal core 13 molded within a shell 14 of insulation material. The core 13 is provided with a longitudinal bore 15 which receives the terminal rod 5. The longitudinal bore preferably does not extend all the way through the core 13, but intersects a cross bore 16 near the extended end of the core so that the extremity of the terminal rod may move into the cross bore and clamp a welding rod therein.

The core 13 is provided with an uncovered externally threaded end 17 which is adapted to screw into the counterbore 4 and thereby move the extremity of the terminal rod into clamping engagement with a welding rod. The confronting ends of the handle 1 and shell are provided respectively with a recess and a boss of reduced diameter which telescope, so that the entire exposed surface of the holder is insulated.

The threads of the sleeve 10 are coarser than the threaded end 17 of the core 13. The sleeve 10 serves to adjust the terminal rod into approximate engagement with a welding rod of given diameter; that is, the terminal rod may be brought into engagement with welding rod by use of the sleeve 10. Thereupon, the thimble may be rotated, either directly by hand, or by using the welding rod as a lever while holding the handle. The relatively fine threads provided at 4 and 17 require that only a relatively weak torque be applied to secure the welding rod and provide adequate contact. Because of the initial adjustment only a partial turn need be made to accomplish this, a turn which can be conveniently accomplished with one hand by pressing the extremity of the welding rod sidewise against a suitable surface.

The spring 8 is preferably made of low resistance material and of such dimensions to pass substantial current and bears tightly against the lock nut 7 and insert 2 to afford good electrical connection therebetween. Thus, dual electrical paths are provided, one directly through the terminal rod, the other through locknut 7, and spring 8, insert 2, and core 13. This is highly desirable, for it should be here noted, that while the current which must be passed is high, the voltage is low; therefore, good contact pressure is required in order to pass the required current. Such pressure is assured through the two paths mentioned, but does not exist between the terminal rod and the bores of the insert and core; hence, cannot be relied upon.

It should be noted that no set screws or other metal parts need protrude through the handle to hold parts in their places within the handle; for, even though such set screws may be covered by insulation material, in the form of cover screws such extra means quickly become lost. Thus, it is important that with the present structure the need therefore is eliminated.

Though I have shown and described a certain embodiment of my invention, I do not wish to be limited thereto, but desire to include all novelty inherent in the appended claims.

I claim:

1. A holder for electric welding rods, comprising: a handle structure; a terminal rod protruding therefrom; a coarse adjusting means for urging said terminal rod outwardly from said handle structure; a thimble structure covering the protruding end of said terminal rod and defining a longitudinal bore accommodating the terminal rod and an intersecting transverse bore adapted to receive a welding rod; and a fine adjusting means between said thimble structure and said handle structure, both of said adjusting means adapted to move the extremity of said terminal rod into said bore, the coarse adjusting means bringing the terminal rod into preliminary engagement with the welding rod, the fine adjusting means forcing the terminal rod into current carrying contact with said welding rod.

2. A holder for electric welding rods, comprising: a handle structure; a terminal rod protruding therefrom; a coarse adjusting means for urging said terminal rod outwardly from said handle structure; yieldable means opposing said coarse adjusting means tending to retract said terminal rod; a thimble structure covering the protruding end of said terminal rod and defining a longitudinal bore accommodating the terminal rod and an intersecting transverse bore adapted to receive a welding rod; a fine adjusting means between said thimble structure and said handle structure, both of said adjusting means adapted to move the extremity of said terminal rod into said bore, the coarse adjusting means bringing the terminal rod into preliminary engagement with the welding rod, the fine adjusting means forcing the terminal rod into current carrying contact with said welding rod; and a terminal socket secured to said terminal rod and interposed between said coarse adjusting means and said terminal rod, said terminal socket adapted to be attached to a welding cable; there being a dual electrical path from said terminal socket to the welding rod, one branch of said path passing directly from said terminal socket through said terminal rod to said welding rod, the other branch passing indirectly from said terminal socket through said yieldable means and said fine adjustment means to said welding rod.

3. A holder for electric welding rods, comprising: a tubular handle structure having threaded portions in its ends; a threaded sleeve fitting one end of said handle structure; a thimble structure screwthreaded into the other end of the said handle structure, said thimble structure having a transverse bore near its extended end adapted to receive a welding rod, and a longitudinal bore communicating between said transverse bore and the interior of said handle structure; and a terminal rod slidably mounted in said handle structure and projecting through the longitudinal bore into the cross bore of said thimble structure; said threaded sleeve forming a coarse adjusting means adapted to urge said terminal rod into said cross bore into approximate position for engagement with a welding rod therein; said thimble structure forming with said handle structure a fine adjustment means for forcing the terminal rod and welding rod into current carrying relation.

4. A holder for electric welding rods, comprising: a tubular handle structure of insulation material having threaded portions in its ends, at least one of which is a metal insert; a threaded sleeve fitting one end of said handle structure; a thimble structure including a covering of insulation material and a metal core, said metal core screwthreaded into said metal insert, said thimble structure having a transverse bore and said core having a longitudinal bore extending from the transverse bore into communication with the interior of said handle structure; and a terminal rod slidably mounted in said handle structure and projecting through the longitudinal bore into the cross bore of said thimble structure; said threaded sleeve forming with said handle structure a coarse adjustment means adapted to urge said terminal rod into said cross bore and into approximate position for engagement with a welding rod therein; said thimble structure forming with said handle structure a fine adjustment means for forcing the terminal rod and welding rod into current carrying relation.

5. A holder for electric welding rods, comprising: a tubular handle structure of insulation material having threaded portions in its ends, at least one of which is a metal insert; a threaded sleeve fitting one end of said handle structure; a thimble structure including a covering of insulation material and a metal core, said metal core screwthreaded into said metal insert, said thimble structure having a transverse bore and said core having a longitudinal bore extending from the transverse bore into communication with the interior of said handle structure; a terminal rod slidably mounted in said handle structure and projecting through the longitudinal bore into the cross bore of said thimble structure; said threaded sleeve forming a coarse adjustment means adapted to urge said terminal rod into said cross bore and into approximate position for engagement with a welding rod therein; said thimble structure forming with said handle structure a fine adjustment means for forcing the terminal rod and welding rod into current carrying relation; a terminal socket attached to said terminal rod and to a welding cable passing from said handle structure through said threaded sleeve, said terminal socket being electrically connected with said welding rod through a dual electric path, one branch through said terminal rod, the other through said metal insert and core.

6. A holder for electric welding rods, comprising: a tubular handle structure of insulation material having threaded portions in its end; at least one of which is a metal insert; a threaded sleeve fitting one end of said handle structure; a thimble structure including a covering of insulation material and a metal core, said metal core screwthreaded into said metal insert, said thimble structure having a transverse bore and said core having a longitudinal bore extending from the transverse bore into communication with the interior of said handle structure; and a terminal rod slidably mounted in said handle structure and projecting through the longitudinal bore into the cross bore of said thimble structure; said threaded sleeve forming with said handle structure a coarse adjustment means adapted to urge said terminal rod into said cross bore and into approximate position for engagement with a welding rod therein; said thimble structure forming with said handle structure a fine adjustment means for forcing the terminal rod and welding rod into current carrying relation; a terminal socket for the terminal rod within said handle structure; a spring yieldably and electrically connecting said terminal socket and said metal insert to form an electrical path from said terminal socket to said core and welding rod, there also being an electrical path from said terminal socket directly to said terminal rod and welding rod.

FLORIAN ERNEST TRINAJSTICH.